US012437101B2

(12) United States Patent
Thakur et al.

(10) Patent No.: US 12,437,101 B2
(45) Date of Patent: Oct. 7, 2025

(54) PRIVILEGE GRAPH-BASED REPRESENTATION OF DATA ACCESS AUTHORIZATIONS

(71) Applicant: Veza Technologies, Inc., Los Gatos, CA (US)

(72) Inventors: Tarun Thakur, Los Gatos, CA (US); Maohua Lu, Fremont, CA (US)

(73) Assignee: Veza Technologies, Inc., Los Gatos, CA (US)

(*) Notice: Subject to any disclaimer, the term of this patent is extended or adjusted under 35 U.S.C. 154(b) by 601 days.

(21) Appl. No.: 17/464,928

(22) Filed: Sep. 2, 2021

(65) Prior Publication Data

US 2022/0067186 A1     Mar. 3, 2022

Related U.S. Application Data

(60) Provisional application No. 63/073,751, filed on Sep. 2, 2020, provisional application No. 63/067,193, filed on Aug. 18, 2020.

(51) Int. Cl.
| | |
|---|---|
| *G06F 21/62* | (2013.01) |
| *G06F 16/21* | (2019.01) |
| *G06F 16/901* | (2019.01) |
| *G06F 21/60* | (2013.01) |

(52) U.S. Cl.
CPC .......... *G06F 21/6236* (2013.01); *G06F 16/21* (2019.01); *G06F 16/9024* (2019.01); *G06F 21/604* (2013.01); *G06F 21/6218* (2013.01); *G06F 21/6227* (2013.01); *G06F 2221/2113* (2013.01)

(58) Field of Classification Search
CPC .. G06F 16/21; G06F 16/9024; G06F 21/6236; G06F 21/604; G06F 21/6218; G06F 21/6227; G06F 2221/2113
See application file for complete search history.

(56) References Cited

U.S. PATENT DOCUMENTS

| | | |
|---|---|---|
| 8,965,991 B1 | 2/2015 | McKinnon et al. |
| 9,146,733 B1 | 9/2015 | McKinnon et al. |
| 10,733,055 B1 | 8/2020 | Grisby |
| 2002/0186260 A1 | 12/2002 | Young |
| 2005/0138420 A1 | 6/2005 | Sampathkumar |
| 2010/0082865 A1 | 4/2010 | Kirshenbaum |
| 2010/0257206 A1 | 10/2010 | Brown |
| 2013/0144893 A1 | 6/2013 | Voigt et al. |
| 2014/0298481 A1 | 10/2014 | Gilroy |
| 2016/0087960 A1* | 3/2016 | Pleau .................. G06F 21/6236 726/7 |
| 2018/0013777 A1 | 1/2018 | DiValentin |
| 2018/0075252 A1 | 3/2018 | Rasmussen |
| 2018/0159876 A1 | 6/2018 | Park et al. |
| 2018/0196928 A1 | 7/2018 | Gilpin et al. |

(Continued)

*Primary Examiner* — Hee K Song

(57) ABSTRACT

The technology disclosed herein enables representation of data access authorizations using a privilege graph. In a particular embodiment, a method includes identifying first attributes of a first user. The method further includes traversing nodes of a privilege graph using the first attributes to determine subsequent nodes until one or more nodes representing a first subset of environments of a plurality of data environments is reached. The method also includes authorizing the first user to access the first subset.

20 Claims, 10 Drawing Sheets

(56) References Cited

U.S. PATENT DOCUMENTS

| | | |
|---|---|---|
| 2018/0211056 A1* | 7/2018 | Delisser .............. G06F 21/6218 |
| 2018/0307853 A1 | 10/2018 | Mehta |
| 2019/0384926 A1 | 12/2019 | Wu et al. |
| 2020/0074338 A1* | 3/2020 | Florentino ............... G06N 7/01 |
| 2020/0125543 A1 | 4/2020 | Zhang |
| 2020/0134362 A1 | 4/2020 | Luo et al. |
| 2020/0175071 A1 | 6/2020 | Ogrinz et al. |
| 2020/0280564 A1 | 9/2020 | Badawy et al. |
| 2020/0334377 A1 | 10/2020 | Turgeman et al. |
| 2020/0358778 A1 | 11/2020 | Gopinathapai et al. |
| 2021/0201198 A1 | 7/2021 | Li et al. |
| 2021/0243190 A1 | 8/2021 | Bargury |
| 2023/0351287 A1 | 11/2023 | Thompson |

\* cited by examiner

PRIVILEGE GRAPH-BASED REPRESENTATION OF DATA ACCESS AUTHORIZATIONS

RELATED APPLICATIONS

This application is related to and claims priority to U.S. Provisional Patent Application 63/067,193, titled "PRIVILEGE GRAPH-BASED REPRESENTATION OF DATA ACCESS AUTHORIZATIONS," filed Aug. 18, 2020, and U.S. Provisional Patent Application 63/073,751, titled "GENERATION OF A PRIVILEGE GRAPH TO REPRESENT DATA ACCESS AUTHORIZATIONS," filed Sep. 2, 2020, which are both hereby incorporated by reference in their entirety.

BACKGROUND

Modern enterprises use numerous data environments to store, manage, and/or process data and those environments may be managed by different systems, applications, and/or platforms from different providers and each may use its own data repository (e.g., database). For instance, different departments may employ different database systems depending on the features offered by the respective system (e.g., accounting may use a first database system while human resources uses a second). In some cases, a single department may itself use multiple platforms for data repositories depending on the capabilities of each platform even if the platforms manage similar data sets. For example, human resources may use one platform to onboard and terminate employees from the enterprise while another platform is used to handle employees' compensation and benefits. The repositories may be hosted local to the enterprise (i.e., at one or more of the enterprise's own facilities) or may be cloud based and hosted by third parties. Likewise, the cardinality of the data environments and the data therein can be very high (on the order of thousands of individual elements, such as data tables, to which a user can potentially access), which makes it very difficult (if not impossible) for a human administrator to track which data can be accessed by which users.

SUMMARY

The technology disclosed herein enables representation of data access authorizations using a privilege graph. In a particular embodiment, a method includes identifying first attributes of a first user. The method further includes traversing nodes of a privilege graph using the first attributes to determine subsequent nodes until one or more nodes representing a first subset of environments of a plurality of data environments is reached. The method also includes authorizing the first user to access the first subset.

In some embodiments, the method includes identifying second attributes of a second user, traversing nodes of the privilege graph using the second attributes to determine subsequent nodes until one or more nodes representing a second subset of environments of the plurality of data environments is reached. The second subset is different than the first subset. The method also includes authorizing the second user to access the second subset.

In some embodiments, the method includes displaying the privilege graph to an administrator authorized to view the privilege graph. In those embodiments, the method may include receiving a Boolean search query from the administrator and displaying a portion of the privilege graph that satisfies the Boolean search query.

In some embodiments, the method includes determining that the first user should have access to a first data environment that is not included in the first subset, identifying an attribute change to the first attributes that would allow the first user to access the first data environment, and applying the attribute change to the first attributes. In those embodiments, the method may include presenting the attribute change to an administrator and receiving confirmation that the attribute change should be applied, wherein applying the attribute change occurs in response to the confirmation. Also, in those embodiments, the method may include displaying the privilege graph to an administrator after the privilege graph is updated to reflect that the attribute change has been applied to the first attributes.

In some embodiments, receiving one or more alert parameters from an administrator, wherein the alert parameters, when satisfied, trigger an alert to the administrator and presenting the alert to the administrator in response to determining that the privilege graph satisfies the alert parameters.

In some embodiments, the method includes determining that an anomaly exists in the first subset relative to other users having similar attributes to the first attribute and notifying an administrator about the anomaly.

In some embodiments, the first user is a human, an application, or a computing system.

In another embodiment, an apparatus is provided having one or more computer readable storage media and a processing system operatively coupled with the one or more computer readable storage media. Program instructions stored on the one or more computer readable storage media, when read and executed by the processing system, direct the processing system to identify first attributes of a first user and traverse nodes of a privilege graph using the first attributes to determine subsequent nodes until one or more nodes representing a first subset of environments of a plurality of data environments is reached. The method further directs the processing system to authorize the first user to access the first subset.

DETAILED DESCRIPTION

Each of the data environments discussed above uses its own mechanisms to regulate which users have access to which features and which data. That is, the mechanisms regulate the privileges that each user has for accessing each data environment and prevent users who are not authorized to access certain features or data from doing so. As such, each environment needs to receive information defining the privileges for each user that is authorized to access at least a portion of the features/data available therefrom. To automatically manage user privileges across a multitude of data environments, the authorization service described herein uses a privilege graph to track users and corresponding privileges. By organizing privileges into a privilege graph, the graph can be displayed to an administrator enabling the administrator to better visualize which users are allowed which data environments and which attributes of those users have. The administrator may view the visual connections in the privilege graph between users, their attributes, and their allowed data environments to determine, for example, that a connection exists that should not or a connection that should exists does not. Without being displayed in the visual manner described below, those connections may not be made from the data being presented in some other manner and/or not aggregated for multiple data environments at all.

Figure 1:
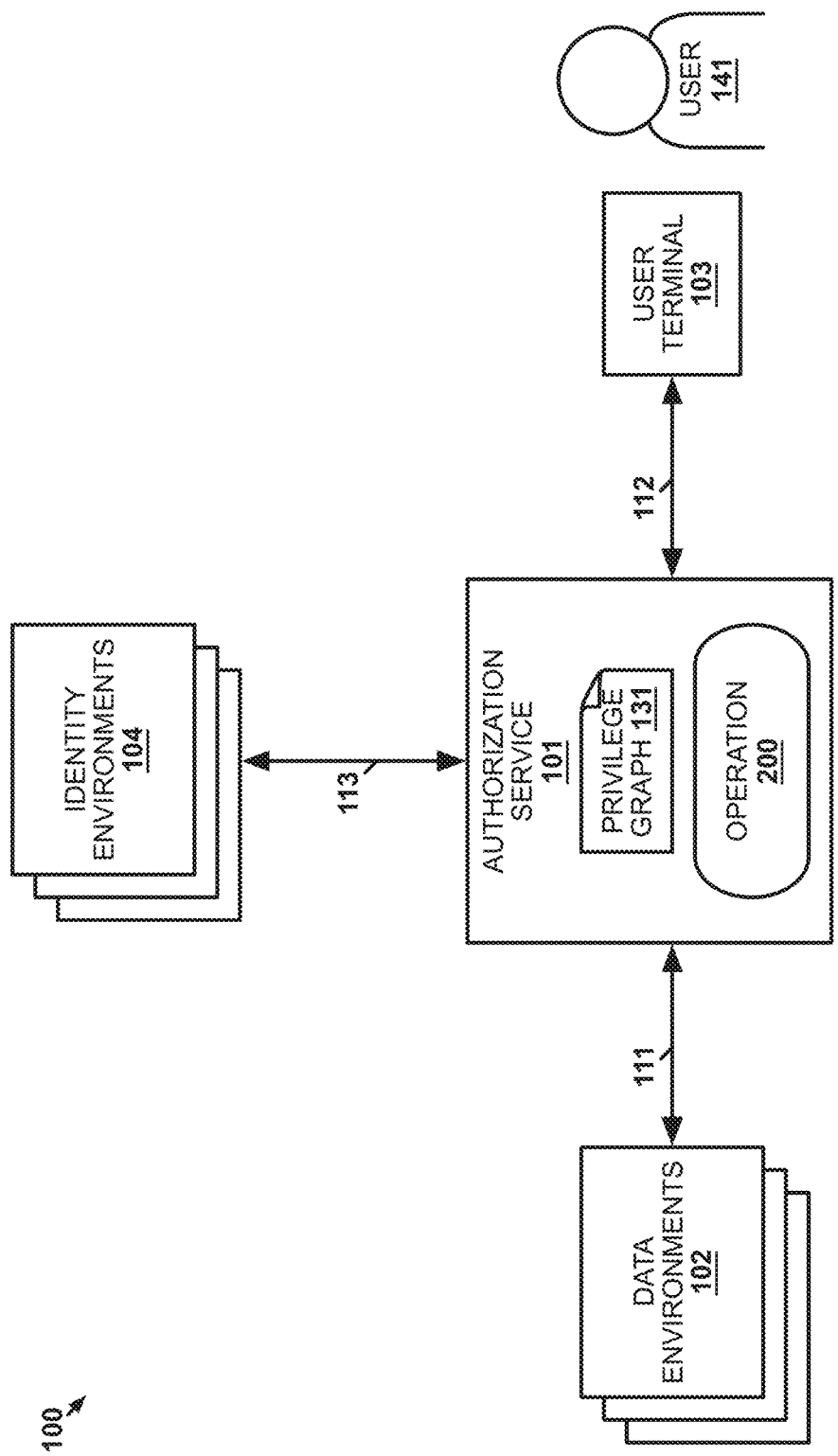
FIG. 1 illustrates an implementation for privilege graph-based representation of data access authorizations.

FIG. 1 illustrates implementation 100 for privilege graph-based representation of data access authorizations. Implementation 100 includes authorization service 101, data environments 102, user terminal 103, and identity environments 104. Authorization service 101 and data environments 102 communicate over respective communication links 111. Authorization service 101 and user terminal 103 communicate over communication link 112. Authorization service 101 and identity environments 104 communicate over respective communication links 113. While communication links 111-113 are shown as direct links, communication links 111-113 may include intervening systems, networks, and/or devices. Authorization service 101 executes on one or more computing systems, such as server systems, having processing and communication circuitry to operate as described below. User terminal 103 is a user operated computing system, such as a desktop workstation, laptop, tablet computer, smartphone, etc., that user 141 uses to access data environments 102.

In operation, authorization service 101 maintains privilege graph 131 to track authorizations defined in identity environments 104 and corresponding ones of data environments 102. Identity environments 104 include one or more systems that maintain information about users (e.g., user identity information, user attributes, etc.) and information about which of data environments (including specific data/features therein) each user is allowed to access. Identity environments 104 may include an active directory (AD) server, a privilege access management (PAM) system, human resources management system (HRMS), identity and access governance (IAG) system, or any other type of system that maintains the user information discussed above. By tracking the authorization of many, if not all, users in an organization (e.g., business enterprise), privilege graph 131 is able to not only represent authorizations for particular users but also represent authorizations based on attributes of users. For example, when traversing privilege graph 131 using attributes of a user to determine subsequent nodes in the traversal. Based on privilege graph 131, authorization service 101 can configure data environments 102 and/or identity environments 104 to manage the authorizations of particular users based on privilege graph 131. Privilege graph 131 may be stored local to authorization service 101 or may be accessible to authorization service 101 from an external data repository, which may itself be managed by one of data environments 102. Authorization service 101 performs operation 200, described below, to determine access to data environments 102. If privilege graph 131 indicates that a user is able to access a particular subset of data environments 102 and the features/data therein, then authorization service 101 will communicate with that subset to configure it accordingly.

Figure 2:
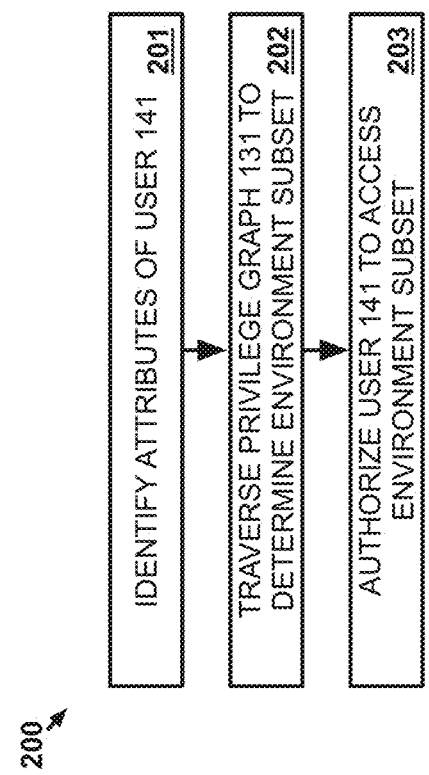
FIG. 2 illustrates an operation for privilege graph-based representation of data access authorizations.

FIG. 2 illustrates operation 200 for privilege graph-based representation of data access authorizations. In operation 200, authorization service 101 identifies attributes of user 141 (201). In this example, user 141 is a human user, although, in other examples, user 141 could be a computing system, application, service, or other type of non-human component that could access one or more of data environments 102 with proper privileges. Users may be identified to authorization service 101 based on an identifier for the particular user, including machine IDs, app IDs, etc. for non-human users. User 141 may identify themselves to authorization service 101 via user terminal 103 or user 141 may be indicated to authorization service 101 from another source, such as an administrator of authorization service 101. That attributes may be provided by an administrative user or authorization service 101 may request the information from another system (e.g., a human resources database in data environments 102). The attributes may indicate a work group for user 141, user 141's job title/role, a seniority or user 141, a security clearance level for user 141, or any other type of attribute that may affect what data environments user 141 can access.

After attributes of user 141 are identified, authorization service 101 traverses nodes of privilege graph 131 using the attributes to determine subsequent nodes until one or more nodes representing an environment subset of the plurality of data environments is reached (202). A node used as a starting point for the traversal may be determined based on a particular attribute, such as a type of user for user 141 (e.g., human, application, computing system, etc.) or a group within the enterprise associated with privilege graph 131 (e.g., sales, marketing, human resources, engineering, etc.). A subsequent node may then be determined based on a different attribute, such as the user's role in the group. Authorization service 101 will continue to traverse to subsequent nodes based on respective attributes of user 141 associated with those nodes. The traversal ends when authorization service 101 reaches a node of privilege graph 131 that points to the subset of data environments 102 that user 141 is allowed to access. In some examples, the last node in the traversal of privilege graph 131 may also point to particular features and/or data in the respective data environments of the subset that user 141 is allowed to access. For example, one of data environments 102 may be a data repository that includes multiple data tables therein and the last node points to which of the tables user 141 is allowed to access.

Once the subset has been determined, authorization service 101 authorizes user 141 to access the subset (and any particular features and/data within the subset if so configured) (203). Authorization service 101 may communicate with data environments and/or identity environments 104 to authorize user 141 to access the subset and, if necessary, specific features/data of the subset (e.g., one or more tables stored in an environment in the subset). As such, authorization service 101 may authorize user 141 by exchanging messages with data environments in the subset indicating to those data environments that user 141 is authorized. For instance, each of the data environments may have application programming interfaces (APIs) that authorization service 101 can call to indicate that user 141 is authorized. Alternatively, authorization service 101 may exchange messages with ones of identity environments 104 that regulate access to the subset. After authorization service 101 has authorized user 141, user 141 may then operate user terminal 103 to access ones of data environments 102 (i.e., the subset) that user 141 has been authorized to access. In some examples, the subset may already be configured to allow user 141 access thereto. In those examples, authorization service 101 may confirm that user 141 still has access during this step. Conversely, if user 141's access to any of data environments 102 changes, then authorization service 101 may update privilege graph 131 to reflect that change. As such, authorization service 101 ensures that privilege graph 131 is periodically updated to reflect the actual authorizations for user 141. Privilege graph 131 is not necessarily in the critical path of authorization service 101 that makes the authorization decisions in some examples. In those examples, the existing authorization mechanisms of identity environments 104 and data environments 102 may be used and privilege graph 131 may be used for reference by an administrator, as described below. Of course, an administrator may reference privilege graph 131 even when authorization service 101 is making authorization decisions based thereon.

Figure 3:
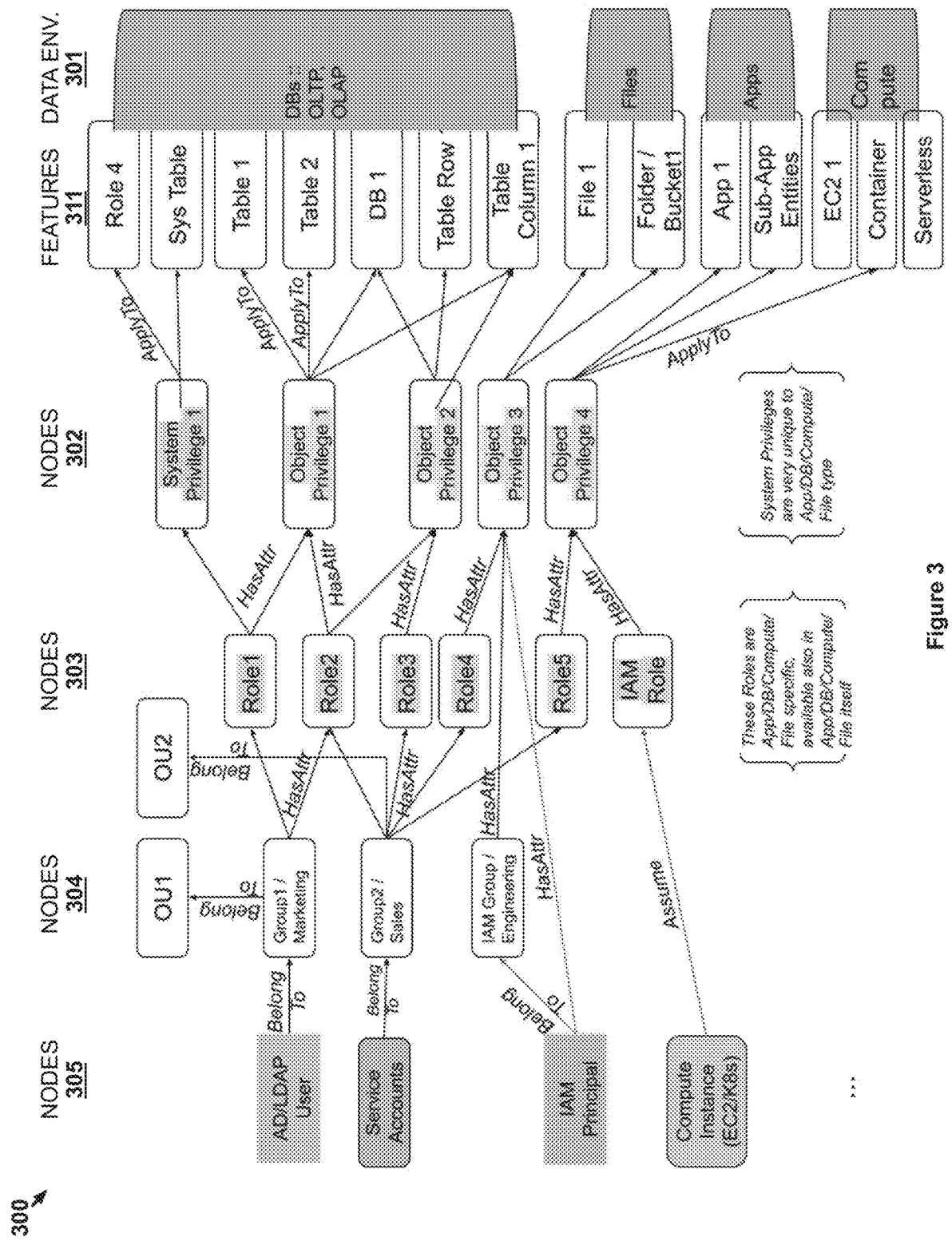
FIG. 3 illustrates a privilege graph for privilege graph-based representation of data access authorizations.

FIG. 3 illustrates privilege graph 300 for privilege graph-based representation of data access authorizations. Privilege graph 300 is an example of privilege graph 131. Data environments 301 are examples of data environments 102. Data environments 301, in this example, include databases, such as databases for Online Transaction Processing (OLTP) and Online Analytical Processing (OLAP), files, applications, and computing resources. Nodes 302 are at a level in the privilege graph that points to particular features 311 of data environments 301 that are accessible to users having attributes that led to respective ones of nodes 302 during traversal of privilege graph 300. Nodes 303 are nodes at a level prior to reaching nodes 302 and represent different roles that a user may have. Similarly, nodes 304 are at a level prior to reaching nodes 303 and represent different groups in which a user may be included. The level before nodes 304 is a level with nodes 305, which represent the users themselves. When a user in nodes 305 has a particular attribute (e.g., is in a particular group), a branch from the node 305 for that user is displayed to a node of nodes 304 representing that attribute. From that node 304, branches are displayed to nodes of nodes 303 that represent other attributes (e.g., roles) that users in the node 304 have. From one of the nodes 303 to which one of those branches terminated, branches are displayed to nodes of nodes 302 that represent other attributes (e.g., privileges) that the users in the node 303 have. As can be seen on privilege graph 300, the branches from nodes 305 may direct to any one of nodes 302-304 because different types of users may not have certain attributes (e.g., may not belong to groups or have a role). Likewise, a user, like the IAM principal node of nodes 305, may branch to different levels of nodes.

Not only is privilege graph 300 a graphical representation of what authorization service 101 may store in memory to perform operation 200, privilege graph 300 may be presented to a user by authorization service 101. For example, user 141 may be a user, such as an administrator, that has a need or desire to view the overall landscape of data environment authorizations represented by privilege graph 300. User 141 may operate user terminal 103 to request privilege graph 300 from authorization service 101 via a graphical user interface (GUI) to authorization service 101 (e.g., a web-based application or native application). User terminal 103 displays privilege graph 300 to user 141 through the GUI. Being able to view privilege graph 300, rather than privilege graph 300 simply being represented in memory, allows user 141 to more easily view which attributes of users lead to those users having access to particular ones of data environments 301.

When viewing privilege graph 300, user 141 may notice that users having certain attribute(s) or combinations of attribute(s) are currently authorized to access a particular data environment of data environments 301, or one of features 311 therein, to which they should not have access. User 141 may then instruct authorization service 101 to deauthorize those users from accessing the particular data environment or user 141 may use user terminal 103 to deauthorize the users from accessing the data environment. Alternatively, user 141 may instruct the particular data environment directly (e.g., log into a user interface thereto) to deauthorize the users. In either situation, authorization service 101 will update privilege graph 300 after the users are deauthorized to reflect the fact that the users are not authorized to access the data environment. In some cases, privilege graph 300 may track how privileges change over time. Thus, in the above example, user 141 may be able to "look back in time" to see that the users were once able to access the data environment that they were deauthorized from accessing.

Additionally, privilege graph 300 may only be one level of details that user 141 is able to view with respect to the privileges depicted thereby. The GUI for authorization service 101 may further allow user 141 to specify what information user 141 wishes to view. For example, while privilege graph 300 shows which user attributes result in authorization to which data environments, user 141 may desire to see which specific users are allowed to access a particular data environment. Upon specifying that desire to authorization service 101, privilege graph 300 may change in the GUI to show specific users as nodes branching from a node representing the particular data environment. In an alternative example, user 141 may specify the they desire to view which attributes of users allow those users to access a particular data environment and nodes representing those attributes may then be displayed branching from the data environment. Of course, other authorization relationships may be presented using privilege graph 300 as well.

Even further uses of privilege graph 300 are envisioned, including Data based dynamic role assignments (e.g., assigning a role to a user based on the data that the role can access), Risk Scores (e.g., assigning a score representing how at risk certain data is for being accessed by an unwanted user), Tagging, Least Privilege Violations, anomaly detection (e.g., identifying users, roles, etc. that should not have access to certain data even though they currently are authorized to do so), monitoring, recommendations, audit reporting, etc.

Figure 4:
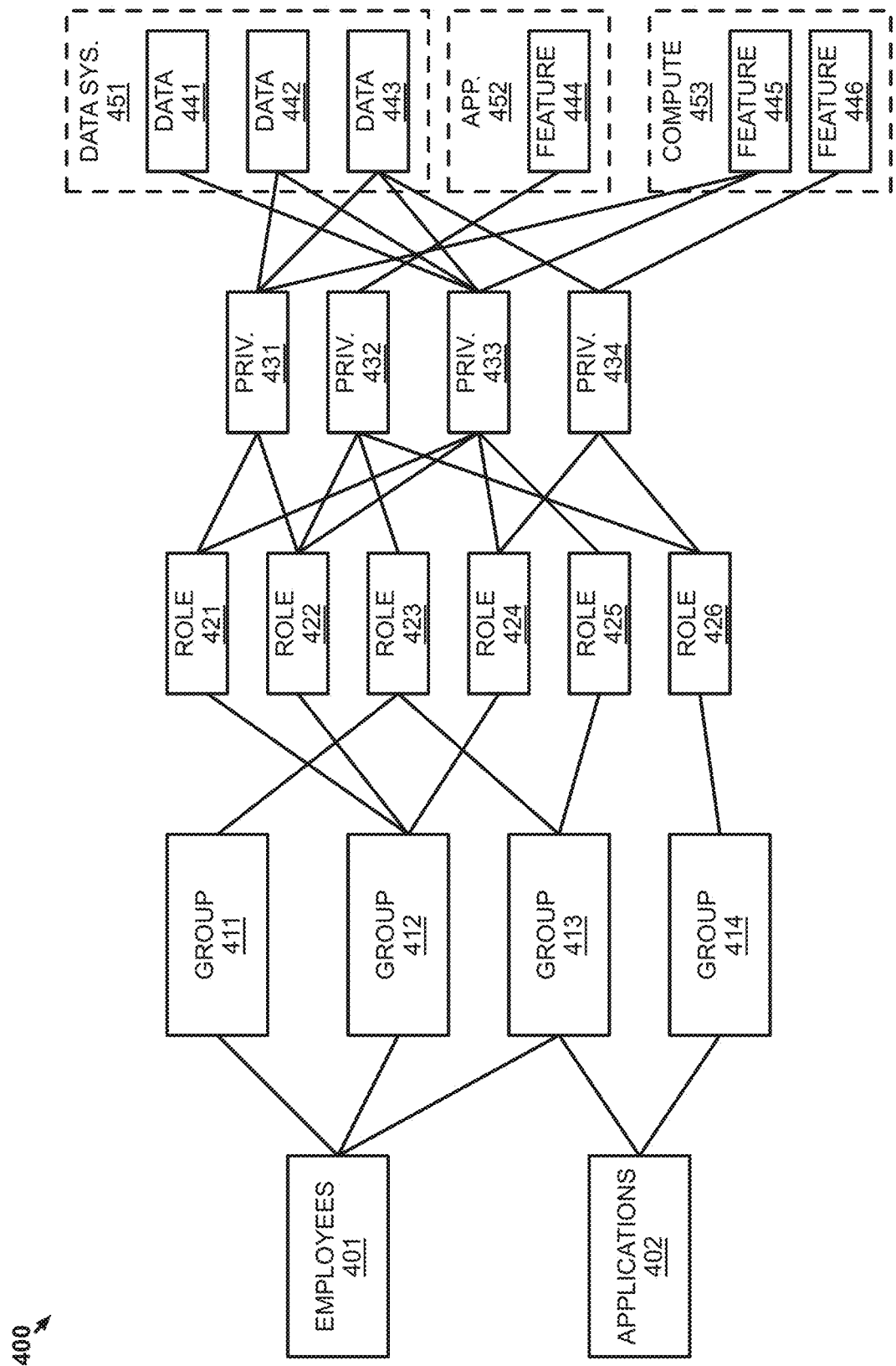
FIG. 4 illustrates a privilege graph for privilege graph-based representation of data access authorizations.

FIG. 4 illustrates privilege graph 400 for privilege graph-based representation of data access authorizations. Privilege graph 400 is another example of privilege graph 131. In this example, user 141 is an administrator to which privilege graph 400 presents a high-level overview of which users have access to which of data environments, including data systems 451, applications 452, and computing resources 453. By tracing through the connections between nodes from left to right, user 141 can see which attribute combinations (i.e., groups, roles, etc.) are currently being allowed to access which data and/or features of the data environments. Authorization service 101 displays privilege graph 400, in this example, through a display of user terminal 103, which may execute an application for interacting with authorization service 101 or access authorization service 101 through a web-based interface.

In this example, the users whose access privileges are represented by privilege graph 400 are employees 401 and applications 402, although other types of users may be included in other examples. Employees 401 and applications 402 may represent the entirety of users under the purview of user 141 or may be only a subset (e.g., user 141 may be responsible for all users in an enterprise or just a subset thereof). When looking at privilege graph 400, user 141 can determine, based on the connections between user nodes and group nodes, that one or more of employees 401 are in groups 411-413 and one or more of applications 402 are in groups 413-414. In some cases, an individual user may belong to more than one of the groups. As user 141 continues to move to the right through privilege graph 400, user 141 follow the connections between nodes for groups 411-414 and roles 421-426 to determine which of groups 411-414 have users with which of roles 421-426. For example, group 412 has connections to role 421, role 422, and role 423. Those connections indicate to user 141 that group 412 has users in each of those roles. In some cases, one user may be in more than one of the roles.

Continuing right from nodes for roles 421-426, user 141 follows connections to the nodes of privileges 431-434 to determine users in which of roles 421-426 have various privileges 431-434. For instance, there are connections from role 422, role 423, and role 426 to privileges 432. As such, one or more users in each of those roles have privileges 432. The node for privileges 432 then connects to show what access is granted by privileges 432. In this case, privileges 432 only have one connection to feature 444 of applications 452. Other privileges enable access to multiple ones of features/data 441-446 (e.g., privileges 431 enable access to data 442, data 443, and feature 445). By viewing privilege graph 400 as a whole, user 141 may be able recognize a connection between nodes that should or should not be in privilege graph 400 and make changes accordingly. Had the users, attributes, and privileges not been displayed in this manner, user 141 may never have recognized the deficiency represented by the connection.

Figure 5:
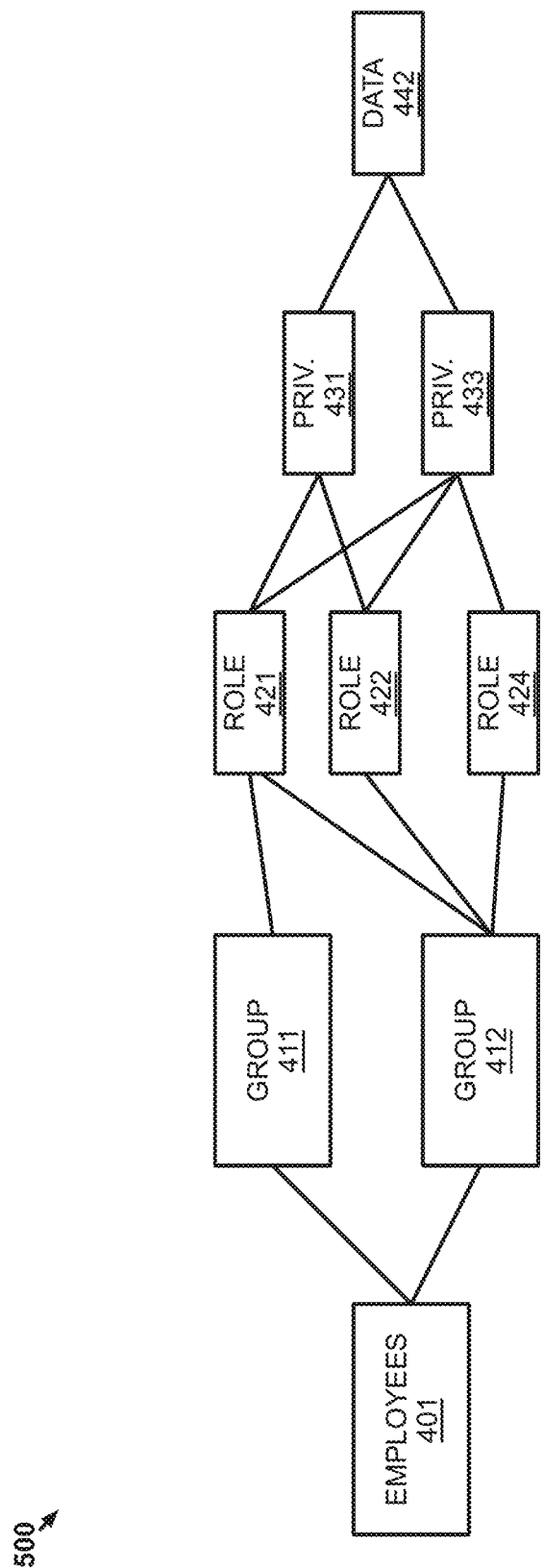
FIG. 5 illustrates a privilege graph for privilege graph-based representation of data access authorizations.

FIG. 5 illustrates privilege graph 500 for privilege graph-based representation of data access authorizations. Privilege graph 500 is an example display of privilege graph 400 after user 141 has instructed authorization service 101, through user terminal 103, for privilege graph 400 to focus on a particular set of nodes and connections therebetween. In this case, user 141 has indicated through user terminal 103 that they are interested in the users and attribute combinations that are allowed to access data 442. As such, user terminal 103 displays only the portion of privilege graph 400 with connections that trace to data 442. Other connections and nodes, which could potentially distract user 141 from what they actually want to see are not displayed. User 141 may interact with the display of privilege graph 400 (e.g., double click the node displayed for data 442) to cause privilege graph 500 to be displayed, may interact with graphical interface elements that, when selected, trigger the focusing action, may provide instructions into a text entry field (e.g., a Boolean or other type of search query), or may instruct user terminal 103 (with the assistance of authorization service 101 in some cases) to display privilege graph 500 in some other manner.

Figure 6:
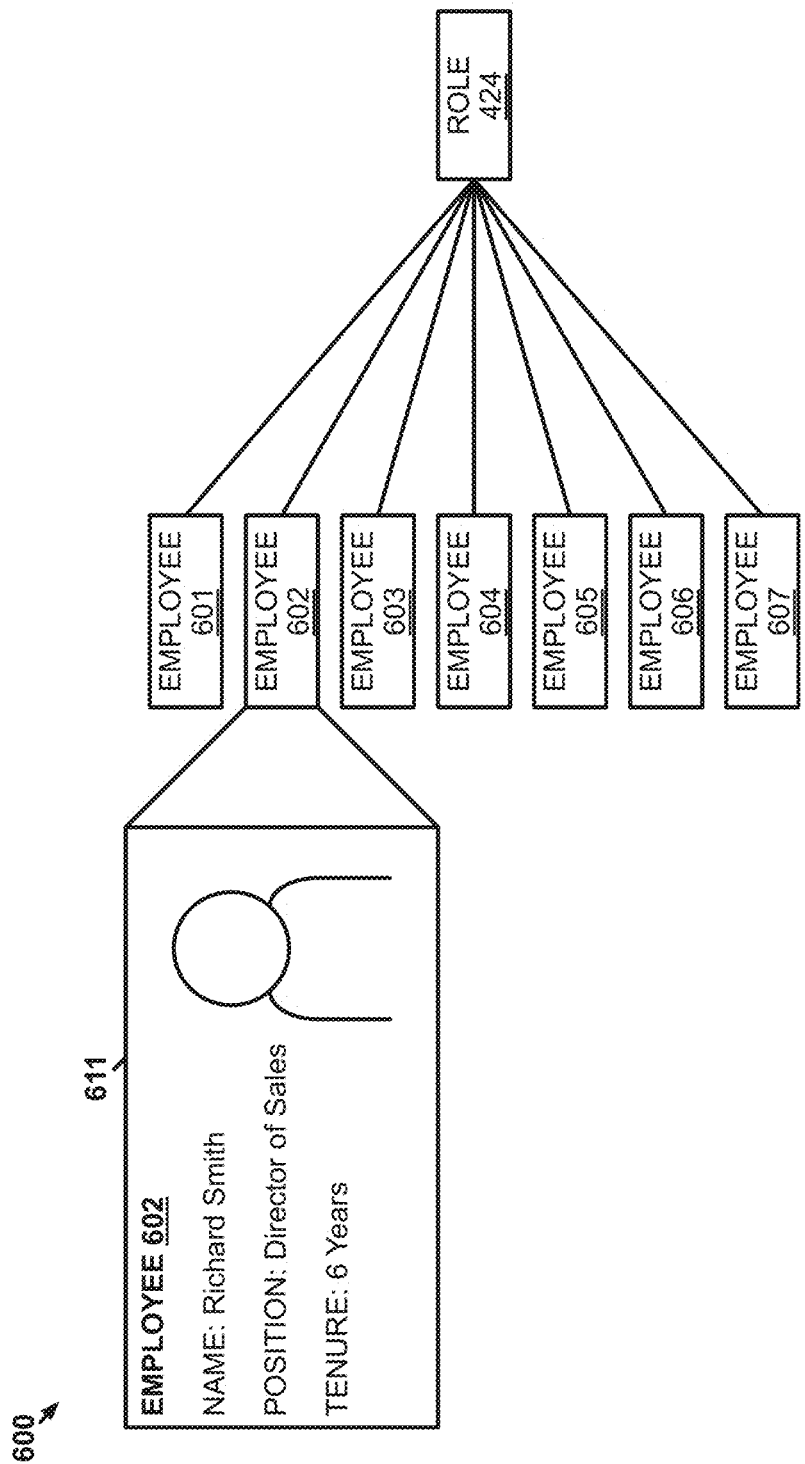
FIG. 6 illustrates a privilege graph for privilege graph-based representation of data access authorizations.

FIG. 6 illustrates privilege graph 600 for privilege graph-based representation of data access authorizations. Privilege graph 600 is an example display of privilege graph 400 after user 141 has instructed authorization service 101, through user terminal 103, for privilege graph 400 to focus on role 424 and expand role 424 to show which of employees 401 have role 424 as an attribute. In some examples, may stem from privilege graph 500 rather than directly from privilege graph 400. For instance, after viewing privilege graph 500, user 141 may decide that they want further detail surrounding the employees that are in role 424 and instruct user terminal 103 to display privilege graph 600 accordingly. User 141 may interact with the display of privilege graph 400/500 (e.g., double click the node displayed for role 424) to cause privilege graph 600 to be displayed, may interact with graphical interface elements that, when selected, trigger the focusing action, may provide instructions into a text entry field (e.g., a Boolean or other type of search query), or may instruct user terminal 103 (with the assistance of authorization service 101 in some cases) to display privilege graph 600 in some other manner.

Privilege graph 600, when displayed by user terminal 103, presents a node for role 424 and displays nodes for each employee of employees 401 that have role 424. Unlike privilege graph 500, which shows nodes that are also included in privilege graph 400, privilege graph 600 shows nodes that were not previously displayed to provide more information to user 141. In this case, user 141 can use user terminal 103 to select one of the nodes for employees 601-607 to view further details about the employee. Employee 602 is selected in this example and popup 611 is displayed showing employee 602's photo, name, position, and tenure at the enterprise. Additional details regarding a particular node may similarly be displayed for other nodes as well in popups similar to popup 611. For example, a popup may show additional information about role 424. Other examples may display the additional information in some other manner.

While the privilege graphs 400-600 in the above examples show one way in which user 141 can view information stored therein, it should be understood that privilege graph 400 may be changed in many other ways to show user 141 the information that they desire in graph form.

Figure 7:
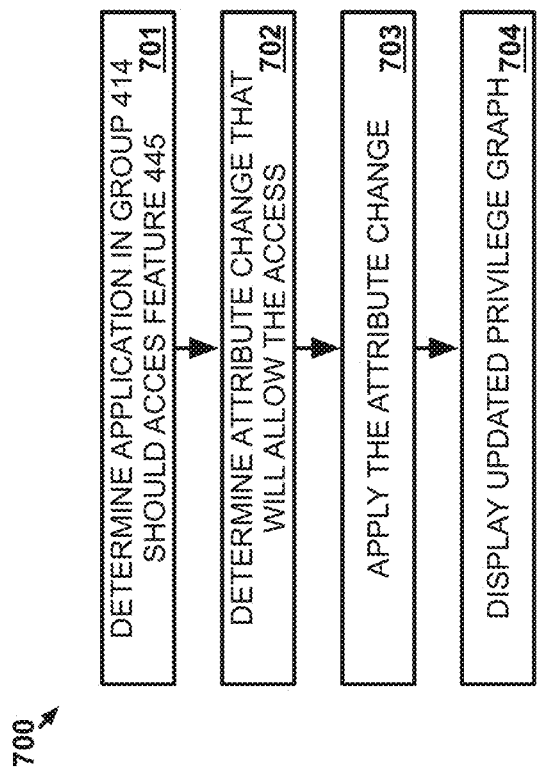
FIG. 7 illustrates an operation for privilege graph-based representation of data access authorizations.

FIG. 7 illustrates operation 700 for privilege graph-based representation of data access authorizations. Operation 700 is an example of how privilege graph 400 may be updated to display new information when privileges change. In operation 700, authorization service 101 determines that an application in group 414 should have access to feature 445 (701). As can be seen from the connections displayed in privilege graph 400, none of applications 402 have access to feature 445. The determination may be made from user 141 indicating to authorization service 101 through user terminal 103 that a particular application should be able to access feature 445. In other examples, authorization service 101 may make the determination on its own. For instance, authorization service 101 may determine that the application previously had access to feature 445 and was unable to find any reason for it to not have that access now.

Authorization service 101 then determines an attribute change that can be made to the attributes of the application that would give the application access to feature 445 (702). The attribute change may remove one or more attributes, add one or more attributes, or replace one or more attributes of the application. For example, based on privilege graph 400, the application may be changed from group 414 to group 413 or the role may be changed from 426 to 425. Alternatively, a different attribute may be added to privilege graph 400 that coincides with privileges, such as privileges 433, that would allow the application to access feature 445 or privileges 432/434 may be adjusted so that the application can access feature 445 under its current attributes.

After the attribute change is determined, authorization service 101 applies the attribute change accordingly (703). Authorization service 101 then updates the display of privilege graph 400 to account for the attribute change (704). For example, if the application was given role 425 to correspond to a role that has access to feature 445, then a new connection will be displayed from group 414 to role 425 that is not currently shown in privilege graph 400.

In this example, the attribute change causes the enabling of the application to access feature 445. In other examples, user 141 or authorization service 101 may enable the application to access feature 445 without changing the attributes that connect the application to feature 445 in privilege graph 400. In those examples, authorization service 101 may recognize that the application can now access feature 445 and update privilege graph 400 to show a connection between the application's attributes and feature 445. If the authorization is independent of privileges 431-434 already shown in privilege graph 400, then authorization service 101 may create a new privilege node with connections to role 426 and feature 445 to account for the application now having access to feature 445. Alternatively, one of privileges 432 or 434 that the application already has may be updated to show access to feature 445 by displaying a new branch connection to feature 445.

Figure 8:
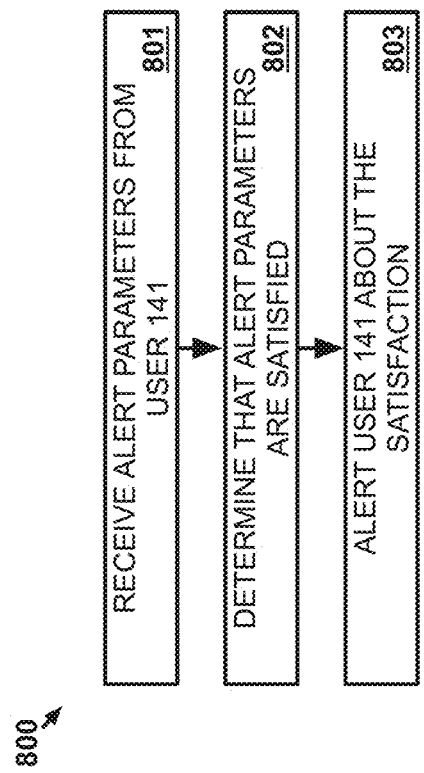
FIG. 8 illustrates an operation for privilege graph-based representation of data access authorizations.

FIG. 8 illustrates operation 800 for privilege graph-based representation of data access authorizations. Operation 800 is an example of how user 141 may configure authorization service 101 to alert them when certain conditions have been met so that user 141 does not have to continually view and monitor privilege graph 400 on their own. In operation 800, authorization service 101 receives alert parameters from user 141 via user terminal 103 (801). The alert parameters define one or more conditions that, when met, trigger authorization service 101 to alert user 141. For example, the parameters may indicate that user 141 should be alerted if an employee having role 423 can access data 441. As currently presented, privilege graph 400 does not show any employee with role 423 having access to data 441 and, in this example, there is a reason for that (e.g., data 441 may be confidential and users in role 423 do not have the authority to access it). Thus, user 141 would want to be alerted if a user in role 423 has access to data 441 (e.g., a user may have inadvertently been given access when setting up the data environments) so that authorization settings can be changed to deny that access.

After receiving the alert parameters, authorization service 101 monitors privilege graph 400 to determine when/if the alert parameters are satisfied. Upon determining that the alert parameters are satisfied (802), authorization service 101 alerts user 141 about the satisfaction of the alert parameters (803). User 141 is alerted through user terminal 103 (e.g., user terminal 103 may display a graphic, play a sound, and/or provide some other notification to alert user 141 to the satisfaction of the alert parameters. In some examples, a portion of privilege graph 400 corresponding to the alert may be highlighted. For instance, using the example above, an employee with role 423 having access to data 441 would cause a new branch connection between the node for role 423 and a node (new or existing) for privileges that allow access to data 441. That new branch may be highlighted to draw user 141's attention thereto.

Figure 9:
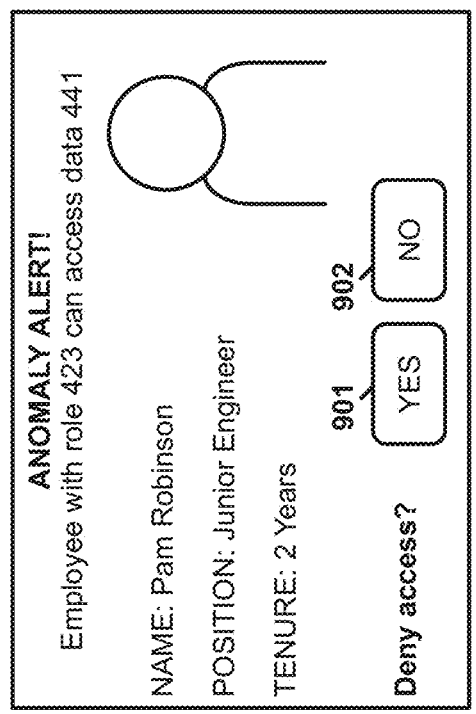
FIG. 9 illustrates an alert window for privilege graph-based representation of data access authorizations.

FIG. 9 illustrates alert window 900 for privilege graph-based representation of data access authorizations. Alert window 900 is an example of the alert that is presented to user 141 in operation 800, although different types of alerts providing different types of information may be used. Alert window 900 displays information consistent with the example above where the alert parameters indicate that user 141 should be alerted if an employee with role 423 access data 441. Alert window 900 indicates the employee's name, position, and tenure. In this example, alert window 900 also includes assent button 901 and decline button 902. Assent button 901, when selected by user 141, instructs authorization service 101 to automatically reconfigure the settings of data systems 451 to deny the employee access to data 441. Decline button 902, when selected by user 141, instructs authorization service 101 to take no further action. For instance, user 141 may want to investigate further to ensure the employee should not be accessing data 441 before denying them access thereto. Other alerts may simply notify user 141 about the satisfaction of the alert parameters without providing options to perform actions in response thereto.

Figure 10:
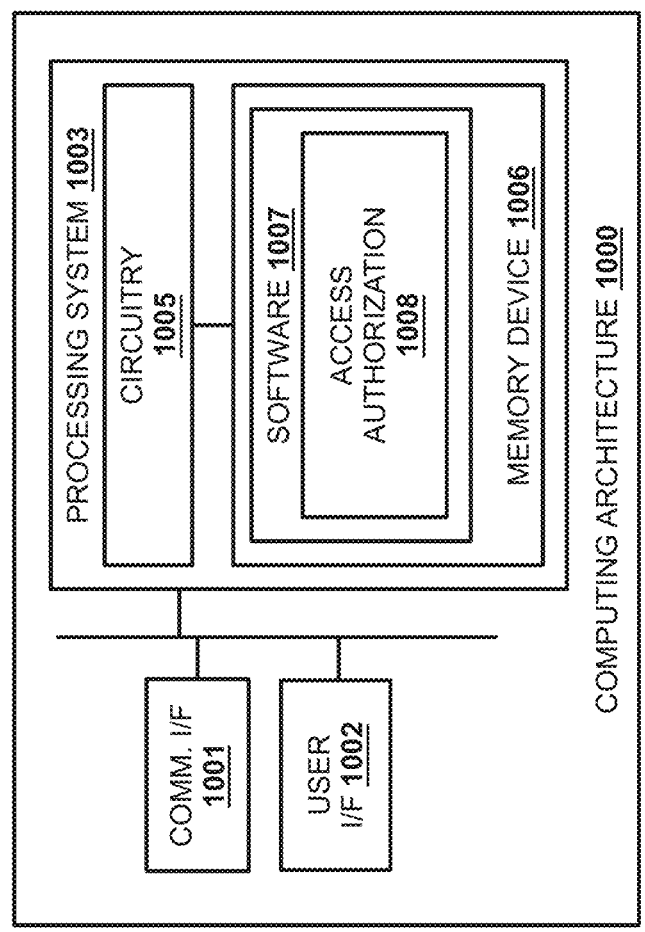
FIG. 10 illustrates a computing architecture for privilege graph-based representation of data access authorizations.

FIG. 10 illustrates computing architecture 1000 for privilege graph-based representation of data access authorizations. Computing architecture 1000 is an example computing architecture for implementing authentication service 101. A similar architecture may also be used for other systems described herein, such as user terminal 103, although alternative configurations may also be used. Computing architecture 1000 comprises communication interface 1001, user interface 1002, and processing system 1003. Processing system 1003 is linked to communication interface 1001 and user interface 1002. Processing system 1003 includes processing circuitry 1005 and memory device 1006 that stores operating software 1007.

Communication interface 1001 comprises components that communicate over communication links, such as network cards, ports, RF transceivers, processing circuitry and software, or some other communication devices. Communication interface 1001 may be configured to communicate over metallic, wireless, or optical links. Communication interface 1001 may be configured to use TDM, IP, Ethernet, optical networking, wireless protocols, communication signaling, or some other communication format—including combinations thereof.

User interface 1002 comprises components that interact with a user. User interface 1002 may include a keyboard, display screen, mouse, touch pad, or some other user input/output apparatus. User interface 1002 may be omitted in some examples.

Processing circuitry 1005 comprises microprocessor and other circuitry that retrieves and executes operating software 1007 from memory device 1006. Memory device 1006 comprises a computer readable storage medium, such as a disk drive, flash drive, data storage circuitry, or some other memory apparatus. In no examples would a storage medium of memory device 1006 be considered a propagated signal. Operating software 1007 comprises computer programs, firmware, or some other form of machine-readable processing instructions. Operating software 1007 includes access authorization module 1008. Operating software 1007 may further include an operating system, utilities, drivers, network interfaces, applications, or some other type of software. When executed by processing circuitry 1005, operating software 1007 directs processing system 1003 to operate computing architecture 1000 as described herein.

In particular, access authorization module 1008 directs processing system 1003 to identify first attributes of a first user and traverse nodes of a privilege graph using the first attributes to determine subsequent nodes until one or more nodes representing an environment subset of the plurality of data environments is reached. Access authorization module 1008 further directs processing system 1003 to authorizing the first user to access the environment subset.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method for privilege graph-based representation of data access authorizations, the method comprising:
   identifying first attributes of a first user;
   performing a traversal of nodes of a privilege graph using the first attributes to determine subsequent nodes until one or more first nodes representing a first subset of environments of a plurality of data environments is reached, wherein the traversal passes through at least one parent node of the one or more first nodes, wherein the at least one parent node represents one or more privileges, and wherein the first user has the one or more privileges with respect to the first subset of environments as indicated by the traversal passing through the at least one parent node before reaching the first subset of environments; and
   authorizing the first user to access the first subset.

2. The method of claim 1, comprising:
   identifying second attributes of a second user;
   performing a second traversal of the nodes of the privilege graph using the second attributes to determine subsequent nodes until one or more second nodes representing a second subset of environments of the plurality of data environments is reached, wherein the second subset is different than the first subset; and
   authorizing the second user to access the second subset.

3. The method of claim 1, comprising:
   displaying the privilege graph to an administrator authorized to view the privilege graph.

4. The method of claim 3, comprising:
   receiving a Boolean search query from the administrator; and
   displaying a portion of the privilege graph that satisfies the Boolean search query.

5. The method of claim 1, comprising:
   determining that the first user should have access to a first data environment that is not included in the first subset;
   identifying an attribute change to the first attributes that would allow the first user to access the first data environment; and
   applying the attribute change to the first attributes.

6. The method of claim 5, comprising:
   presenting the attribute change to an administrator; and
   receiving confirmation that the attribute change should be applied, wherein applying the attribute change occurs in response to the confirmation.

7. The method of claim 5, comprising:
   displaying the privilege graph to an administrator after the privilege graph is updated to reflect that the attribute change has been applied to the first attributes.

8. The method of claim 1, comprising:
   receiving one or more alert parameters from an administrator, wherein the alert parameters, when satisfied, trigger an alert to the administrator; and
   presenting the alert to the administrator in response to determining that the privilege graph satisfies the alert parameters.

9. The method of claim 1, comprising:
   determining that an anomaly exists in the first subset relative to other users having similar attributes to the first attributes; and
   notifying an administrator about the anomaly.

10. The method of claim 1, wherein the first user is a human, an application, or a computing system.

11. An apparatus comprising:
    one or more computer readable storage media;
    a processing system operatively coupled with the one or more computer readable storage media; and
    program instructions stored on the one or more computer readable storage media that, when read and executed by the processing system, direct the processing system to:
    identify first attributes of a first user;
    perform a traversal of nodes of a privilege graph using the first attributes to determine subsequent nodes until one or more first nodes representing a first subset of environments of a plurality of data environments is reached, wherein the traversal passes through at least one parent node of the one or more first nodes, wherein the at least one parent node represents one or more privileges, and wherein the first user has the one or more privileges with respect to the first subset of environments as indicated by the traversal passing through the at least one parent node before reaching the first subset of environments; and
    authorize the first user to access the first subset.

12. The apparatus of claim 11, wherein the program instructions direct the processing system to:
    identify second attributes of a second user;
    perform a second traversal of nodes of the privilege graph using the second attributes to determine subsequent nodes until one or more second nodes representing a second subset of environments of the plurality of data environments is reached, wherein the second subset is different than the first subset; and
    authorize the second user to access the second subset.

13. The apparatus of claim 11, wherein the program instructions direct the processing system to:
    display the privilege graph to an administrator authorized to view the privilege graph.

14. The apparatus of claim 13, wherein the program instructions direct the processing system to:
    receive a Boolean search query from the administrator; and
    display a portion of the privilege graph that satisfies the Boolean search query.

15. The apparatus of claim 11, wherein the program instructions direct the processing system to:
    determine that the first user should have access to a first data environment that is not included in the first subset;
    identify an attribute change to the first attributes that would allow the first user to access the first data environment; and
    apply the attribute change to the first attributes.

16. The apparatus of claim 15, wherein the program instructions direct the processing system to:

present the attribute change to an administrator; and receive confirmation that the attribute change should be applied, wherein applying the attribute change occurs in response to the confirmation.

17. The apparatus of claim 15, wherein the program instructions direct the processing system to:

display the privilege graph to an administrator after the privilege graph is updated to reflect that the attribute change has been applied to the first attributes.

18. The apparatus of claim 11, wherein the program instructions direct the processing system to:

receive one or more alert parameters from an administrator, wherein the alert parameters, when satisfied, trigger an alert to the administrator; and present the alert to the administrator in response to determining that the privilege graph satisfies the alert parameters.

19. The apparatus of claim 11, wherein the program instructions direct the processing system to:

determine that an anomaly exists in the first subset relative to other users having similar attributes to the first attributes; and notify an administrator about the anomaly.

20. One or more non-transitory computer readable storage media having program instructions stored thereon that, when read and executed by a processing system, direct the processing system to:

identify first attributes of a first user;

perform a traversal of nodes of a privilege graph using the first attributes to determine subsequent nodes until one or more first nodes representing a first subset of environments of a plurality of data environments is reached, wherein the traversal passes through at least one parent node of the one or more first nodes, wherein the at least one parent node represents one or more privileges, and wherein the first user has the one or more privileges with respect to the first subset of environments as indicated by the traversal passing through the at least one parent node before reaching the first subset of environments; and authorize the first user to access the first subset.

\* \* \* \* \*